(12) United States Patent
Jackson et al.

(10) Patent No.: US 10,920,857 B2
(45) Date of Patent: Feb. 16, 2021

(54) TWIN COUNTERSHAFT TRANSMISSION WITH SPLINE

(71) Applicant: Eaton Cummins Automated Transmission Technologies LLC, Indianapolis, IN (US)

(72) Inventors: Graeme A. Jackson, Kalamazoo, MI (US); Andrzej A. Wota, Gdansk (PL)

(73) Assignee: Eaton Cummins Automated Transmission Technologies LLC, Galesburg, MI (US)

( * ) Notice: Subject to any disclaimer, the term of this patent is extended or adjusted under 35 U.S.C. 154(b) by 759 days.

(21) Appl. No.: 15/550,657

(22) PCT Filed: Feb. 12, 2016

(86) PCT No.: PCT/US2016/017898
§ 371 (c)(1),
(2) Date: Aug. 11, 2017

(87) PCT Pub. No.: WO2016/131017
PCT Pub. Date: Aug. 18, 2016

(65) Prior Publication Data
US 2018/0038456 A1   Feb. 8, 2018

Related U.S. Application Data

(60) Provisional application No. 62/115,838, filed on Feb. 13, 2015.

(51) Int. Cl.
*F16H 3/095* (2006.01)
*F16H 37/04* (2006.01)
(Continued)

(52) U.S. Cl.
CPC ............ *F16H 3/095* (2013.01); *F16D 1/101* (2013.01); *F16H 1/28* (2013.01); *F16H 37/046* (2013.01);
(Continued)

(58) Field of Classification Search
CPC ... F16H 3/095; F16H 37/046; F16D 2001/103
(Continued)

(56) References Cited

U.S. PATENT DOCUMENTS 3,237,472 A   3/1966 Perkins
5,398,563 A   3/1995 Stine
(Continued)

FOREIGN PATENT DOCUMENTS

EP   0043443 A2   1/1982
EP   2767412 A1   8/2014
(Continued)

OTHER PUBLICATIONS

Chinese Office Action dated Aug. 29, 2019 (corresponding to CN201680017896.1) with English translation of Office Action Summary.
(Continued)

*Primary Examiner* — Ha Dinh Ho
(74) *Attorney, Agent, or Firm* — Harness, Dickey & Pierce, P.L.C.

(57) ABSTRACT

A transmission includes a countershaft, a splitter section having an input shaft and a clutch that couples the input shaft to the countershaft, a main transmission assembly having a main shaft and a main transmission clutch, the main shaft coupled to the countershaft via the main transmission clutch, a range gear assembly having a an annulus gear, a sun gear, a planet gear, and center shaft that provides output from the transmission, and a spline joint that couples the main shaft to the center shaft and in operation transfers torque through (Continued)

and reduces eccentric loads between the main shaft and the center shaft that occur due to axial misalignment.

16 Claims, 4 Drawing Sheets

(51) Int. Cl.
| | |
|---|---|
| *F16H 1/10* | (2006.01) |
| *F16H 57/021* | (2012.01) |
| *F16D 1/10* | (2006.01) |
| *F16H 1/28* | (2006.01) |
| *F16H 57/00* | (2012.01) |
| *F16D 3/06* | (2006.01) |

(52) U.S. Cl.
CPC ....... *F16H 57/0025* (2013.01); *F16H 57/021* (2013.01); *F16D 3/06* (2013.01); *F16D 2001/103* (2013.01)

(58) Field of Classification Search
USPC .................................. 74/325, 331
See application file for complete search history.

(56) References Cited

U.S. PATENT DOCUMENTS

| | | | |
|---|---|---|---|
| 5,588,930 A | 12/1996 | Chen | |
| 6,622,473 B2 | 9/2003 | Becquerelle et al. | |
| 7,597,644 B2* | 10/2009 | Rodgers, II | F16H 3/006 475/218 |
| 8,038,564 B2* | 10/2011 | Earhart | F16H 37/0833 475/218 |
| 8,050,832 B2 | 11/2011 | Fuhrer et al. | |
| 8,419,582 B2* | 4/2013 | Renner | F16H 3/006 475/221 |
| 9,714,698 B2* | 7/2017 | Markl | F16H 3/006 |
| 10,047,840 B2* | 8/2018 | Gumpoldsberger | F16H 3/093 |
| 2003/0199356 A1 | 10/2003 | Biallas | |
| 2005/0043136 A1 | 2/2005 | Colter et al. | |
| 2008/0127758 A1 | 6/2008 | Gitt | |
| 2009/0062058 A1 | 3/2009 | Kimes et al. | |
| 2009/0095101 A1 | 4/2009 | Gitt | |
| 2010/0296934 A1 | 11/2010 | Warren | |
| 2011/0030488 A1 | 2/2011 | Gumpoltsberger et al. | |
| 2011/0259147 A1* | 10/2011 | Hoffmann | F16H 37/046 74/745 |
| 2012/0115674 A1* | 5/2012 | Ikegami | B60K 6/36 477/3 |
| 2013/0053204 A1 | 2/2013 | Slapak | |

FOREIGN PATENT DOCUMENTS

| | | |
|---|---|---|
| JP | H05346323 A | 12/1993 |
| JP | H10329056 A | 12/1998 |
| JP | 2010216535 A | 9/2010 |

OTHER PUBLICATIONS

Indian Office Action dated Jun. 11, 2020 (corresponding to IN 201717029589).
English abstract JP-H10-329056A.
English abstract JP-H05-346323A.
European Search Report dated Mar. 15, 2019 for European Patent Application No. 16750037.0.
Communication Pursuant to Article 94(3) EPC dated Mar. 19, 2020 (corresponding to EP 16750037.0).
Chinese Office Action dated Jul. 29, 2020 with Engllish translation of Summary (corresponding to CN 201680017896.1).

* cited by examiner

TWIN COUNTERSHAFT TRANSMISSION WITH SPLINE

CROSS-REFERENCE TO RELATED APPLICATIONS

This application is a U.S. National Phase Application of PCT application PCT/US2016/017898 filed Feb. 12, 2016, which claims priority to U.S. Provisional Application Ser. No. 62/115,838 filed Feb. 13, 2015, the disclosures of which are incorporated in their entirety.

TECHNICAL FIELD

The present disclosure relates to heavy duty transmission architecture for vehicles and more specifically to a transmission architecture that is configured to better facilitate automated shifting of a sliding clutch transmission, either as an automated manual transmission or a dual clutch transmission.

BACKGROUND

Manual transmissions are used for various vehicle applications. Such transmissions typically include a multiple speed main section containing a plurality of gears for various range and load gearing configurations. Traditionally, a clutch provides momentary torque interrupt when gear ratio changes occur. The clutch is used to engage the transmission from a driving shaft powered by an engine. Shifting with torque interrupt, however, is a manually demanding process that requires repeated engagement of the driver.

Systems have been developed to improve the shifting process, such as automated manual transmissions (AMTs) and dual clutch transmissions (DCTs). An AMT includes a clutch, a gearbox, and an embedded dedicated control system that uses electronic sensors, processors, and actuators to actuate gear shifts on the driver's throttle pedal command. An AMT removes the need for a clutch pedal while the driver is still able to control vehicle movement. The clutch itself is actuated by electronic equipment that can synchronize the timing and the torque required to make gear shifts quick and smooth.

Dual clutch transmissions (DCTs) have been developed that enable shifting between sets of gears without torque interrupt. In a dual clutch, the inner shaft and the outer shaft may have two or more connectable gears (via sliding clutches or sliding clutches and synchronizers) that drive their respective downstream layshaft members for appropriate speed ratios. The clutches can be alternately engaged as the gear progression is achieved between, for example, four sequential gears to permit power shifting between the progressive four ratios.

In some transmission designs, the number of gear shift options results in the operator having to shift up sequentially through all gear ratios before reaching full speed. Such transmission designs can include either an AMT or a DCT. It is desirable to increase the number of gear ratios in the transmission to facilitate skip shifting in lower gears while having an adequate range of operation of the gears at higher speeds for improved fuel efficiency. Accordingly, transmission designs typically include a range gearbox section that provides additional gear combination options for a wide variety of operating conditions. For instance, lower range gears may be used when under heavy load or when starting the vehicle on an uphill.

In one example, the range gearbox includes a planetary gear system in which a center or sun gear is driven by the main shaft of the transmission. The planetary gear system is selectively engaged to provide either a direct transmission of power to an output shaft, or to step down the operation via engagement with a planetary gear. In such a design, the main shaft of the transmission directly engages with the sun gear of the planetary gear system. However, due to a buildup of tolerances between the main transmission and the range transmission, the main transmission shaft and the sun gear can be eccentrically aligned, which can lead to wear and early life failure.

BRIEF DESCRIPTION OF THE DRAWINGS

Referring now to the drawings, illustrative examples are shown in detail. Although the drawings represent the exemplary illustrations described herein, the drawings are not necessarily to scale and certain features may be exaggerated to better illustrate and explain an innovative aspect of an exemplary illustration. Further, the exemplary illustrations described herein are not intended to be exhaustive or otherwise limiting or restricting to the precise form and configuration shown in the drawings and disclosed in the following detailed description. Exemplary illustrations of the present invention are described in detail by referring to the drawings as follows.

DETAILED DESCRIPTION

An exemplary transmission architecture may be configured to have mechanisms and associated functions of an automated manual transmission (AMT), so as to provide model flexibility for application variances. AMT devices may be activated using electro-pneumatic, electro-hydraulic, and electro-mechanical devices. An AMT removes the need for a clutch pedal while the driver is still able to control vehicle movement.

In a typical AMT control scheme, a constant engine speed is requested during engagement so as to equalize engine and clutch torques as much as practical using such a scheme. Clutch control may provide a clutch torque reference, and through a suitable model, the torque reference is converted into a position reference for the clutch actuator position control. AMT designs provide model flexibility for application variances. AMT ratio change steps are designed to be somewhat small and fast, so as to be generally unnoticeable to a vehicle operator whose driving experience is similar to that associated with a power shifted device. The transmission may be further configured to provide even smaller steps when AMT ratio changes are encountered. These very small steps minimize perceived shift delay (such as a few milliseconds) or AMT engine speed droop. The transmission can also be configured to use small actuation energy/time to accomplish the AMT ratio changes and improve the operating efficiency in high range (driving speeds) ratios.

Exemplary transmissions can have a direct drive configuration, overdrive configuration, or double overdrive configuration. These transmissions can have a gearbox including a 4×2×2 configuration (16 gear combinations), a 3×3×2 configuration (18 gear combinations), a 5×2×2 (20 gear combinations) configuration or other suitable configurations as desired. Exemplary single and double overdrive designs are discussed below. Overdrive is commonly known as a gear or gear combination in a motor vehicle that provides a gear ratio that is higher than that of a drive or input shaft, so that engine speed and fuel consumption are reduced. Thus, a single overdrive transmission design includes one gear combination that is higher than that of the input shaft, and a dual overdrive transmission includes two gear combinations that are higher than that of the input shaft.

An advantage of the exemplary transmission architecture is a robust design for application variances. In particular, the exemplary transmission can have a housing configured to contain therein any single type of a family of transmissions. Two examples can include the DCT and the AMT. However, the housing can be configured to enclose other suitable transmissions.

Figure 1:
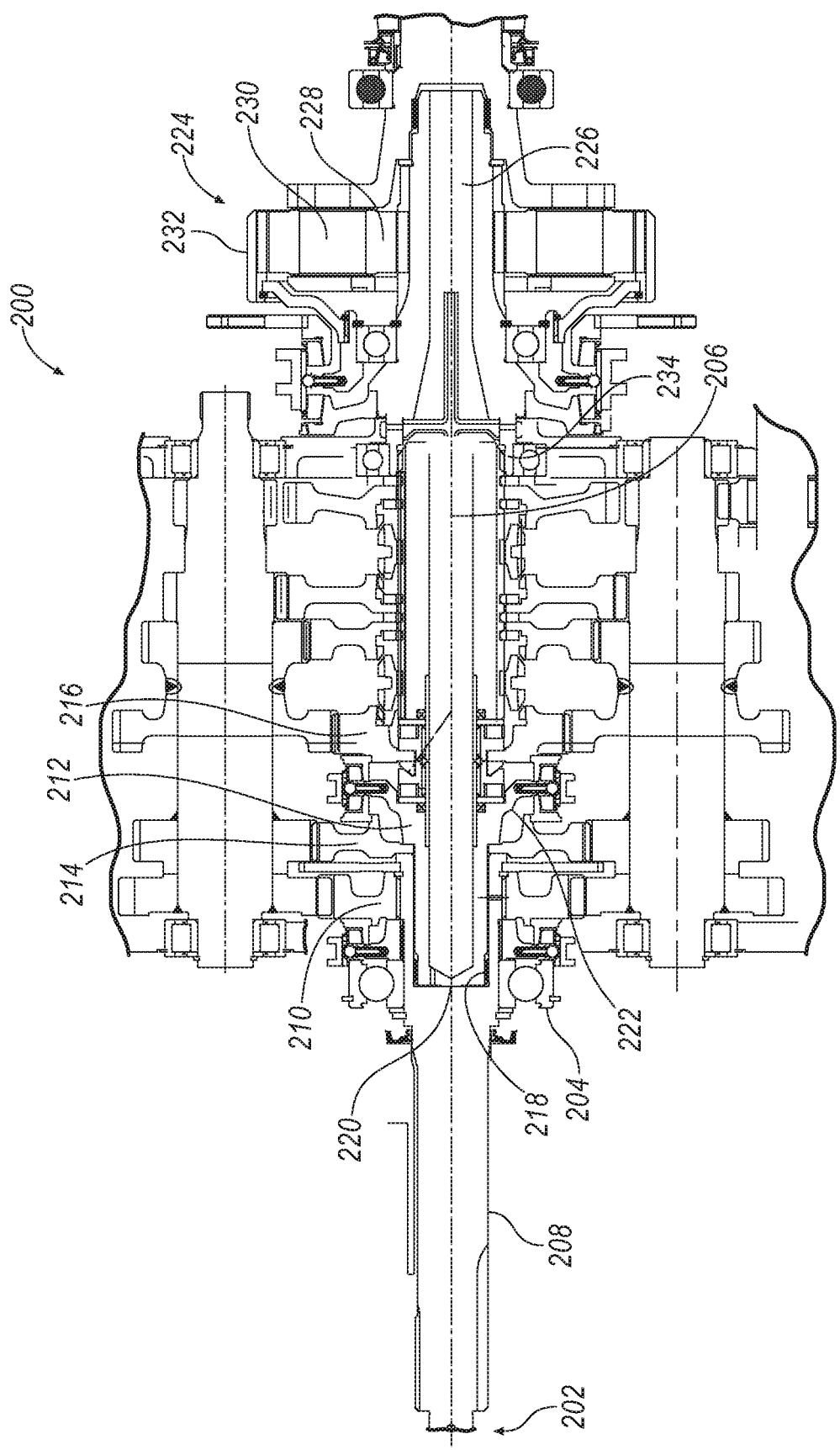
FIG. 1 illustrates a 3×3×2 transmission configuration according to one exemplary aspect of the present teachings.

FIG. 1 illustrates an exemplary 3×3×2 configuration 200 that is attractive due to its 18 ratios with smaller ratio step size and larger overall ratio coverage as compared to a 12 speed 2×3×2 base. Typically, a 12 speed 2×3×2 design includes a two splitter input shaft section. The illustrated 3×3×2 configuration 200, on the other hand, includes a three splitter input shaft section. One challenge with a three splitter input shaft driven gears is the additional radial displacement of the longer input shaft with respect to the gearbox centerline. The radial displacement is inherent due to clutch housing, engine flywheel housing, engine block, journal bearing clearance and crankshaft eccentric tolerances. These tolerances may accumulate to potentially misalign a front pilot journal located at position 202 of the input shaft (at the engine crankshaft) with respect to a transmission input shaft bearing 204 (affixed to the clutch housing) and with respect to a gearbox centerline 206. Such a misalignment can result in the input shaft rear portion (i.e., the portion residing within the gearbox) being radially displaced with respect to the gearbox centerline 206. To the extent there is a radial displacement, the radial displacement can increase linearly with respect to the axial distance from the transmission input shaft bearing 204. Coupling multiple drive gears to the input shaft and accommodating the radial displacement with respect to the centerline can present a challenge.

Therefore, the 3×3×2 configuration 200 includes a front input shaft 208 with the ability to couple to a coaxial front drive gear 210 or uncouple in a neutral state, and a rear input shaft 212 with the ability to couple to either a coaxial $2^{nd}$ drive gear 214, a coaxial $3^{rd}$ drive gear 216, or uncoupled in a neutral state. Front input shaft 208 transfers torsional power to rear input shaft 212 via a spline joint 218. As will be further discussed, spline joint 218 reduces interference and radial offsets from one another, while allowing for proper torque transfer between eccentric components, which reduces wear in the bearings.

The front input shaft 208 and rear input shaft 212 are coupled together and axially contact each other at a surface 220 to transmit thrust loading. All three drive gears 210, 214, 216 are free to rotate about their respective input shaft axis when not affixed to an input shaft. Spline joint 218 includes circumferential clearance between teeth on the front input shaft 208 and grooves (in which the teeth pass) on rear input shaft 214, a rear input shaft synchronizer clutch hub 222 is able to locate coaxial with either $2^{nd}$ drive gear 214 or $3^{rd}$ drive gear 216 with little or no radial displacement with respect to those drive gears. Spline joint 218 teeth are positioned within a bore of front input shaft 208, such that torsional power can pass therethrough. Configuration 200 includes a range gearbox having a range center shaft 226 that includes a sun gear 228, and a planetary gear or gears 230 that is circumferentially constrained by an outer ring gear 232. In the illustrated aspect of the present teachings, a clearance fit spline joint 234 is included to provide suitable clearance between components. That is, spline joint 234 avoids axial interference while allowing for proper torque transfer between eccentric components, which reduces wear in the bearings. Misalignment of components due to tolerance buildup throughout configuration 200 can therefore be relieved.

Figure 2A:
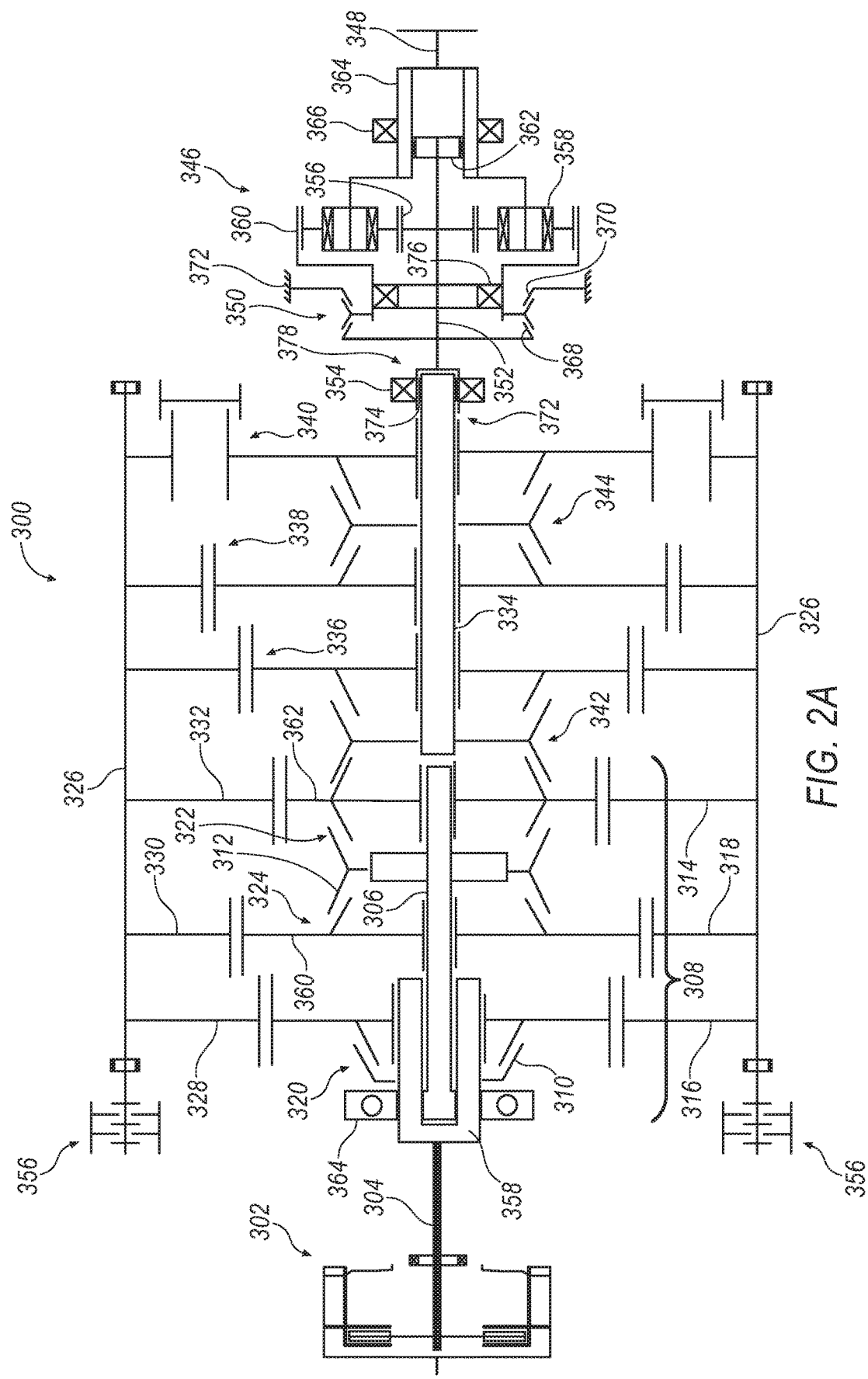
FIG. 2A is a schematic representation of an exemplary 3×3×2 transmission configuration with AMT in accordance with the present teachings.

FIG. 2A is a schematic configuration or representation 300 of the 3×3×2 transmission configuration 200 of FIG. 1, having a main transmission clutch 302 for operating the three splitter input that includes a front input shaft 304 and a rear input shaft 306. A splitter section 308 is operable via clutch 302, and splitter section 308 includes a forward clutch 310 and a rearward clutch 312. Forward and rearward clutches 310, 312 are coupled together and configured to selectively engage a gear 314, a gear 316, or a gear 318 via actuators. That is, forward clutch 310 engages gear 316 via a clutch mechanism 320, and rearward clutch 312 selectively engages either gear 314 or 318 via rearward or forward motion of rearward clutch 312, and its respective engagement with a clutch mechanism 322 or a clutch mechanism 324.

Configuration 300 includes countershafts 326 having respective gears 328, 330, 332 that enable coupling from both input shafts 304, 306. Configuration 300 is thereby illustrated as a dual countershaft arrangement. However, although a dual countershaft is illustrated, it is contemplated that configuration 300 may also include a single countershaft 326. Clutches 310, 312 are operable to engage, or not, by their respective clutch mechanisms 320, 322, 324. As an example, when clutch mechanism 320 is engaged, then clutch 312 is in a neutral position, and inputs shafts 304/306 cause rotation of countershaft 326 via gear 316 and gear 328. As another example, when gear mechanism 324 is engaged, then clutch mechanism 320 is disengaged and clutch 310 rotates freely with respect to gear 316. Input is thereby via gear 318 and gear 330 to countershaft 326.

Configuration 300 includes a main shaft 334 that is coupled to countershafts 326 via pairs of gears 332, 336, 338, 340, and is operable as an AMT. Main shaft 334 includes a forward clutch 342 and a rearward clutch 344 which, through selective forward or rearward motion, engage countershaft 326 with the main shaft 334. Selective engagement of the main shaft clutches 342, 344 enables implementation of various gear ratio combinations with gear 340 providing a reverse capability. Thus, depending on which gear in splitter section 308 is engaged, and which gear along main shaft 334 is engaged, various gear ratios may be implemented.

In addition, configuration 300 includes a range gearbox 346 having an output shaft 348 that is selectively engaged via a range clutch 350. Range gearbox 346 includes a range center shaft 352 that is coupled to main shaft 334. A bearing 354 supports range center shaft 352. Range gearbox 346 includes a sun gear 356, planetary gears 358, and a ring or annulus gear 360. Range center shaft 352 is also supported by a bearing 362. Output shaft 348 includes an outer shaft 364 that is supported by a bearing 366. In one example, gears of range gearbox 346 are helical gears.

In operation of range gearbox 346, range clutch 350 may be positioned in a first position to engage with a first gear 368, or positioned in a second position to engage with a second gear 370. When range clutch 350 is engaged with first gear 368, ring gear 360 is caused to rotate, which causes a counter rotation of planetary gear(s) 358 and in turn causes rotation of output shaft 348. When range clutch 350 is engaged with second gear 370, rotation of ring gear 360 is locked via a ground, which thereby causes rotation of sun gear 356 and engagement thereof with planetary gear(s) 358.

It will be appreciated in light of the disclosure that tolerance buildup between range gearbox 346 and main shaft 334 can be shown to cause eccentric rotation of main shaft 334 with respect to range center shaft 352, which can occur at location 372 between main shaft 334 and range center shaft 352. That is, transmission 300 includes a radially floating main shaft 334 which can be shown to result in planetary system eccentricity. To simplify design and operation and as illustrated, bearing 354 supports the split shafts of main shaft 334 and range center shaft 352. Accordingly, a clearance fit spline joint 374 is included to provide suitable radial clearance between them and can be shown to limit the eccentric loads and allow axial forces to balance. Sun gear or range center shaft 352 can be supported by bearing 362, which can be shown to further reduce planetary system eccentricity.

Figure 2B:
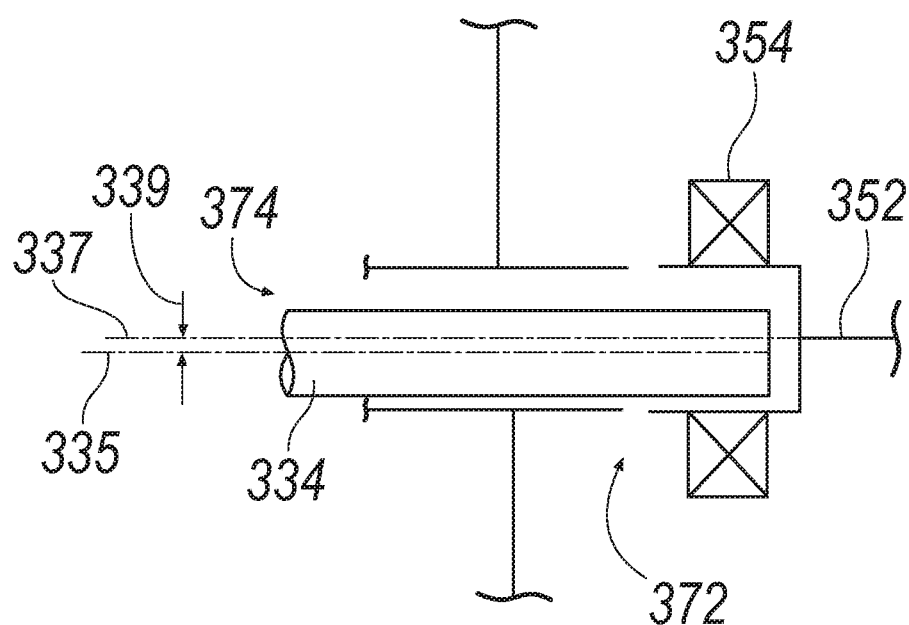
FIG. 2B is a schematic illustration of a spline joint of FIG. 2A further illustrating misalignment of shafts that can occur.

FIG. 2B is a schematic illustration of spline joint 374 of FIG. 2A, further illustrating misalignment of shafts that can occur due to tolerance buildup between, for instance, main shaft 334 and center shaft 352. Referring to FIG. 2A, due to tolerance buildup between components, main shaft 334 having a first rotational centerline 335 may not properly align with center shaft 352 having a second rotational centerline 337. More specifically, first centerline 335 and second centerline 337 may have an axial offset 339 from one another. As such, spline joint 374 accommodates misalignment of shafts due to its ability to operate having radial play between components. Accordingly, eccentric loads that may occur due to misalignment between main shaft 334 and center shaft 352 are reduced because of axial play in spline joint 374.

Planetary range assembly or gearbox 346 is shown configured to balance axial loading generated by the gears of the planetary gear train to reduce transmission load. Planet gears 358, when in a helical configuration, generate a first axial force on sun gear 356 and a second axial force on annulus gear 360 opposite the first axial force. To avoid axial force influence on bearings within the transmission, the annulus gear 360 can be supported by a bearing 376, on the same shaft 352 as sun gear 356. This leads to sun gear and annulus gear axial loads that can be shown to balance with the first and second axial forces, therefore can be shown to reduce wear on the bearings.

Accordingly, the disclosed transmission includes countershaft 326 and a splitter section 308 having an input shaft 304 and a clutch 310 that couples the input shaft 304 to countershaft 326. A main transmission assembly includes main shaft 334 and main transmission clutches 342, 344, the main shaft 334 coupled to the countershaft 326 via the main transmission clutches 342, 344. A range gear assembly 346 includes range center shaft 352 that provides output from the transmission. A spline joint couples the main shaft 334 to the range center shaft 352 and transfers torque therethrough.

Figure 3:
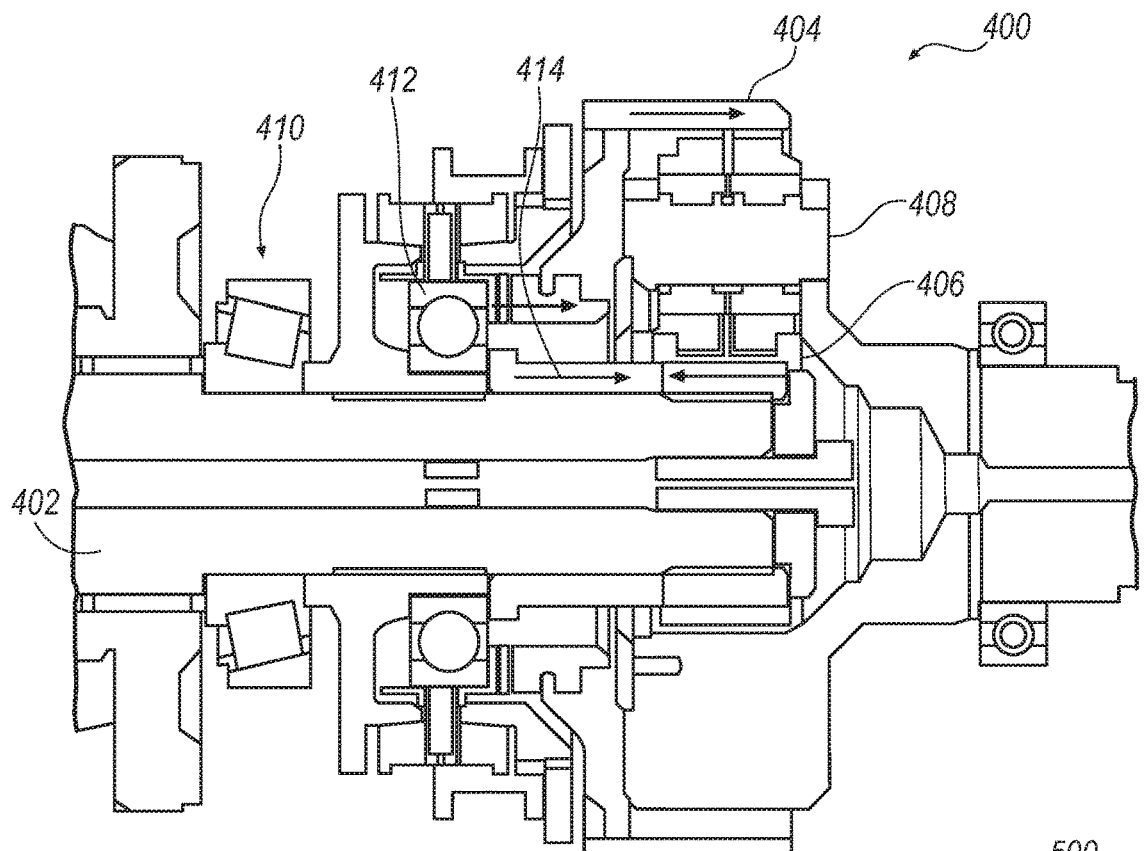
FIG. 3 illustrates an alternate exemplary arrangement for a range gearbox in accordance with the present teachings.

FIG. 3 illustrates an alternate arrangement 400 for a range gearbox, in which a main range shaft 402 includes an annulus gear 404, sun gear 406, and planet gear 408. In this arrangement, however, a taper bearing 410 is included which can cause axial forces to increase. In this alternate arrangement, as well, bearing 412 is positioned to receive and transmit an axial force 414 to sun gear 406. This can lead to sun gear and annulus gear axial loads that balance with the first and second axial forces, which can be shown to reduce wear on the bearings.

Figure 4:
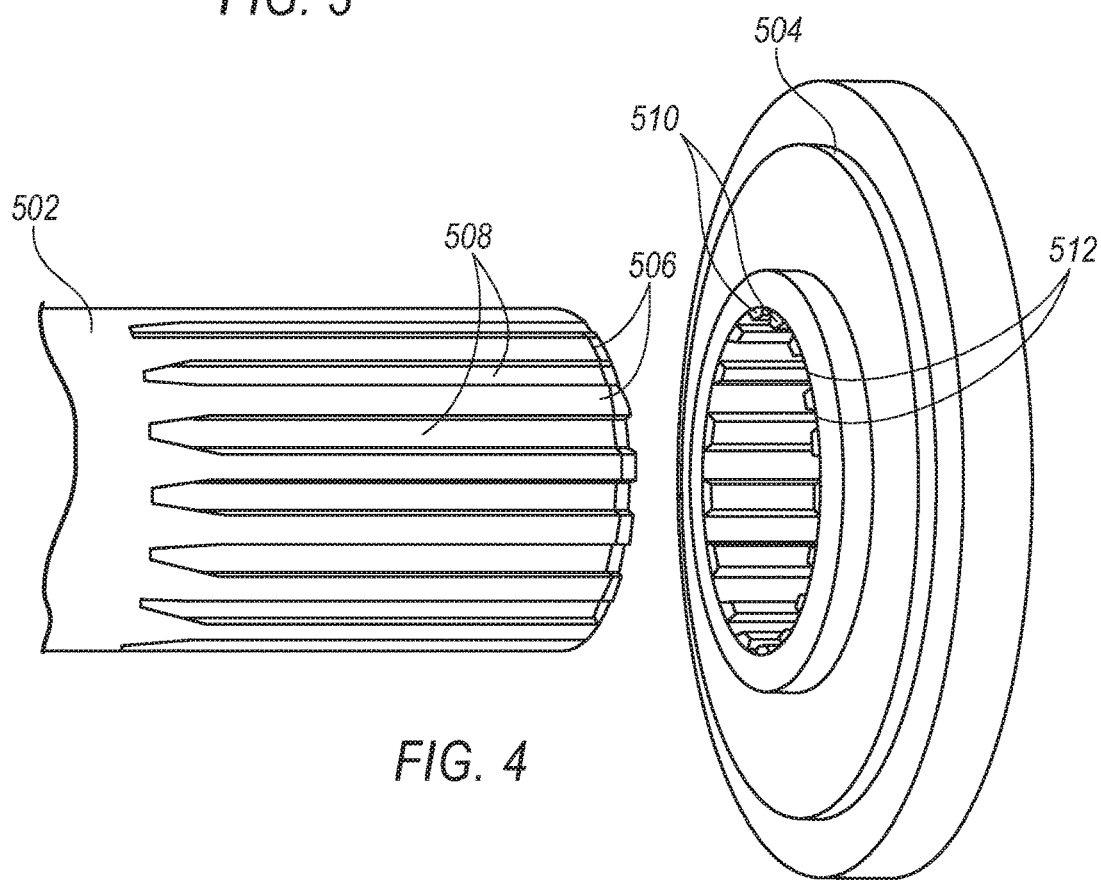
FIG. 4 illustrates an exemplary spline joint which may be incorporated into the disclosed exemplary transmission configurations in accordance with the present teachings.

FIG. 4 illustrates an exemplary spline joint 500, which may be utilized as, for instance, spline joint 374 of FIG. 3. Spline joint 500 includes an inner shaft 502 that is positionable within a bore 504. Shaft 502 includes circumferentially positioned ribs 506 and grooves 508. Bore 504 includes ribs 510 and grooves 512. Shaft 502 may be positioned axially therein, while avoiding interference. However, ribs and grooves 506, 508 and ribs and grooves 510, 512 are designed such that a circumferential interference is formed and a torque may be transferred between shaft 502 and bore 504, while allowing a slight amount of mechanical "play" in the radial direction. Thus, referring back to FIG. 2, as an example shaft 502 corresponds to main shaft 334, and bore 504 corresponds to a bore 378, allowing for a slight amount of radial play due to minor eccentricities that exist between shaft 334 and range center shaft 352.

Because of the axial fit between components, axial interference is avoided while allowing for proper torque transfer between eccentric components, which reduces wear in the bearings, thereby limiting eccentric loads and allowing axial forces to balance. In the example illustrated, 506, 508 and ribs and grooves 510, 512 are approximately uniformly angularly positioned about a circumference of each of shaft 502 and bore 504 and illustrated with a common axial extent. However, it is contemplated that mating grooves and ridges may be positioned in non-uniform arrangements, as well, which in one example may enable a unique angular position or positions of each with respect to the other. That is, having a uniform spacing may enable spaces and grooves to be aligned in any of a number of discrete angles between components, while have non-uniform arrangements the parts may match for axial positioning at only a discrete set of positions. In addition, in one example the component parts that include the spline joint may be arranged having the ribs on one shaft (i.e., on main shaft 334) and the grooves on the other shaft (i.e., range center shaft 352). However, it is contemplated that the arrangement may be reversed and the ribs of the spline joint may be positioned, in this example, on range center shaft 352, and the grooves may be placed on main shaft 334.

Thus, an exemplary method of manufacturing a transmission includes manufacturing the components having a spline joint to accommodate misalignment of components that may occur due to tolerance buildup. That is, the main shaft in the transmission may be misaligned with the center shaft in the range gear that, if directly coupled one to another, may cause excessive eccentric loads to occur. The method includes providing a countershaft and a splitter section that has an input shaft, and a clutch that couples the input shaft to countershaft. A main transmission assembly includes a main shaft and a main transmission clutch, and the main shaft is coupled to the countershaft via the main transmission clutch. The method includes providing a range gear assembly that has an annulus gear, a sun gear, a planet gear, and a center shaft that provides output from the transmission. The method includes fabricating and installing a spline joint that couples the main shaft to the center shaft. Accordingly, the spline joint transfers torque through and reduces eccentric loads between the main shaft and the center shaft due to axial misalignment.

Thus, in the disclosed method of manufacture, the main shaft is a radially floating shaft positioned within a bore of the spline joint. The method includes positioning a first bearing at an axial location of the spline joint that supports both the main shaft and the center shaft at a first end. The method further includes supporting the center shaft using a second bearing at a second end of the center shaft opposite the first end. The second bearing is supported by an outer shaft that is coupled to the planet gear and provides output to an output shaft of the transmission. The range gear assembly is a helical configuration that includes the annulus gear, the sun gear, and the planet gear, and wherein the center shaft is supported by the second bearing, such that sun gear and annulus gear axial loads balance with axial loads of the planet gear. In one example the splitter section is an automated manual transmission splitter section coupled to the main shaft via the countershaft. The automated manual splitter section includes a front input shaft coupled directly to a main clutch and having a first clutch coupled to the countershaft, and a rear input shaft coupled to the front input shaft and having a second clutch coupled to the countershaft. The automated manual transmission splitter section is operable to selectively engage the first clutch and the second clutch. Further, a third bearing may be included on the center shaft and configured to support the annulus gear.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain aspects of the present teachings, and should in no way be construed so as to limit the claimed invention.

Accordingly, it is to be understood that the above description is intended to be illustrative and not restrictive. Many aspects and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future aspects of the present teachings. In sum, it should be understood that the disclosed aspects of the present teachings are capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

Reference in the specification to "one example," "an example," "one approach," or "an application" means that a particular feature, structure, or characteristic described in connection with the example is included in at least one example. The phrase "in one example" in various places in the specification does not necessarily refer to the same example each time it appears.

What is claimed is:

1. A transmission, comprising:
   a pair of twin countershafts each having an identical gear arrangement thereon;
   a splitter section having an input shaft and a clutch that drivingly couples the input shaft to the pair of twin countershafts;
   a main transmission assembly having a main shaft and a main transmission clutch, the main shaft drivingly coupled to the pair of twin countershafts via the main transmission clutch;
   a range gear assembly having an annulus gear, a sun gear, a planet gear, and a center shaft that provides output from the transmission;
   a spline joint that couples the main shaft to the center shaft and in operation transfers torque through and reduces eccentric loads between the main shaft and the center shaft that occur due to axial misalignment, wherein the main shaft is a radially floating shaft positioned within a bore of the spline joint;
   a first bearing positioned at an axial location of the spline joint that supports both the main shaft and the center shaft at a first end;
   a second bearing that supports the center shaft at a second end of the center shaft opposite the first end, the second bearing supported by an outer shaft that is coupled to the planet gear and provides output to an output shaft of the transmission, wherein the range gear assembly is a helical configuration that includes the annulus gear, the sun gear, and the planet gear each having helical teeth, and wherein the center shaft is supported by the second bearing, such that sun gear and annulus gear axial loads balance with axial loads of the planet gear.

2. The transmission of claim 1, wherein the splitter section is an automated manual transmission splitter section drivingly coupled to the main shaft via the pair of countershafts, the automated manual splitter section including:
   a front input shaft coupled directly to a main clutch and having a first clutch drivingly coupled to the pair of twin countershafts; and
   a rear input shaft coupled to the front input shaft and having a second clutch drivingly coupled to the pair of twin countershafts;
   wherein the automated manual transmission splitter section is operable to selectively engage the first clutch and the second clutch.

3. The transmission of claim 1, further comprising a third bearing on the center shaft and configured to support the annulus gear.

4. A transmission, comprising:
   a pair of twin countershafts each having an identical gear arrangement thereon;
       a splitter section having an input shaft and a clutch that drivingly couples the input shaft to the pair of twin countershafts;
       a main transmission assembly having a main shaft and a main transmission clutch, the main shaft drivingly coupled to the pair of twin countershafts via the main transmission clutch;
       a range gear assembly having a center shaft that provides output from the transmission, the range gear assembly including a planetary gear system having an annulus gear, a sun gear, and a planetary gear; and a spline joint that couples the main shaft to the center shaft and in operation transfers torque through and reduces eccentric loads between the main shaft and the center shaft that occur due to axial misalignment, wherein the range gear assembly is a helical configuration that includes helical teeth on the annulus gear, the sun gear, and the planet gear, and wherein the center shaft is supported by the second bearing, such that sun gear and annulus gear axial loads balance with axial loads of the planet gear.

5. The transmission of claim 4, wherein the main shaft is a radially floating shaft positioned within a bore of the spline joint.

6. The transmission of claim 5, further comprising a first bearing positioned at an axial location of the spline joint that supports both the main shaft and the center shaft at a first end.

7. The transmission of claim 6, further comprising a second bearing that supports the center shaft at a second end of the center shaft opposite the first end, the second bearing supported by an outer shaft that is coupled to the planet gear and provides output to an output shaft of the transmission.

8. The transmission of claim 7, further comprising:
a first clutch drivingly coupled to the pair of twin countershafts via one clutch mechanism; and
a second clutch drivingly coupled to the pair of twin countershafts via two clutch mechanisms;
wherein the one clutch mechanism and the two clutch mechanisms are selectively engaged via operation of the splitter section using the main clutch.

9. The transmission of claim 4, wherein the splitter section is an automated manual transmission splitter section drivingly coupled to the main shaft via the pair of twin countershafts, the automated manual splitter section including:
a front input shaft coupled directly to a main clutch and having a first clutch drivingly coupled to the pair of twin countershafts; and
a rear input shaft coupled to the front input shaft and having a second clutch drivingly coupled to the pair of twin countershafts;
wherein the automated manual transmission splitter section is operable to selectively engage the first clutch and the second clutch.

10. A transmission, comprising:
a main transmission assembly having a main shaft and a main transmission clutch, the main shaft drivingly coupled to a pair of twin countershafts via a main transmission clutch, the pair of twin countershafts each having an identical gear arrangement thereon;
a planetary gear assembly having a center shaft that provides output from the transmission, the planetary gear assembly further including an annulus gear, a sun gear, and a planet gear; and
a spline joint that couples the main shaft to the center shaft and in operation transfers torque through and reduces eccentric loads between the main shaft and the center shaft that occur due to axial misalignment, wherein the planetary gear assembly is a helical configuration that includes helical teeth on the annulus gear, the sun gear, and the planet gear, and wherein the sun gear and annulus gear axial loads balance with axial loads of the planet gear.

11. The transmission of claim 10, wherein the main shaft is a radially floating shaft positioned within a bore of the spline joint.

12. The transmission of claim 11, further comprising a first bearing positioned at an axial location of the spline joint that supports both the main shaft and the center shaft at a first end.

13. The transmission of claim 12, further comprising a second bearing that supports the center shaft at a second end of the center shaft opposite the first end, the second bearing supported by an outer shaft that is coupled to the planet gear and provides output to an output shaft of the transmission.

14. The transmission of claim 13, further comprising:
the first clutch drivingly coupled to the pair of twin countershafts via one clutch mechanism; and
the second clutch drivingly coupled to the pair of twin countershafts via two clutch mechanisms;
wherein the one clutch mechanism and the two clutch mechanisms are selectively engageable via operation of the main transmission clutch.

15. The transmission of claim 13, wherein the splitter section is an automated manual transmission splitter section drivingly coupled to the main shaft via the pair of twin countershafts, the splitter section including:
a front input shaft coupled directly to a main clutch and having a first clutch drivingly coupled to the pair of twin countershafts; and
a rear input shaft coupled to the front input shaft and having a second clutch drivingly coupled to the pair of twin countershafts;
wherein the automated manual transmission splitter section is operable to selectively engage the first clutch and the second clutch.

16. The transmission of claim 13, further comprising a third bearing on the center shaft and configured to support the annulus gear.

* * * * *